US012707398B2

(12) United States Patent
Ling et al.

(10) Patent No.: US 12,707,398 B2
(45) Date of Patent: Aug. 11, 2026

(54) METHOD AND APPARATUS FOR POWER CONTROL OF PUSCH REPETITION

(71) Applicant: Lenovo (Beijing) Ltd., Beijing (CN)

(72) Inventors: Wei Ling, Changping (CN); Chenxi Zhu, Haidian District (CN); Bingchao Liu, Changping District (CN); Yi Zhang, Chao Yang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 678 days.

(21) Appl. No.: 17/910,978

(22) PCT Filed: Apr. 22, 2020

(86) PCT No.: PCT/CN2020/086122

§ 371 (c)(1),
(2) Date: Sep. 12, 2022

(87) PCT Pub. No.: WO2021/212364

PCT Pub. Date: Oct. 28, 2021

(65) Prior Publication Data

US 2023/0141329 A1 May 11, 2023

(51) Int. Cl.
*H04W 52/14* (2009.01)
*H04W 52/32* (2009.01)
(Continued)

(52) U.S. Cl.
CPC ....... *H04W 52/146* (2013.01); *H04W 52/325* (2013.01); *H04W 52/48* (2013.01); *H04W 72/232* (2023.01)

(58) Field of Classification Search
CPC . H04W 52/146; H04W 52/325; H04W 52/48; H04W 72/232; H04W 52/242; H04L 5/0044; H04L 5/0051; H04L 5/0053
See application file for complete search history.

(56) References Cited

U.S. PATENT DOCUMENTS 11,617,136 B2 * 3/2023 Wang .................. H04W 52/146 370/329
11,641,261 B1 * 5/2023 Khoshnevisan ........ H04L 1/189 370/329

(Continued)

FOREIGN PATENT DOCUMENTS

CN 103733698 A 4/2014
CN 110536399 A 12/2019
WO 2020032659 A1 2/2020

OTHER PUBLICATIONS 20932827.7 , "Extended European Search Report", EP Application No. 20932827.7, Dec. 18, 2023, 60 pages.

(Continued)

*Primary Examiner* — Jinsong Hu
*Assistant Examiner* — Rui M Hu
(74) *Attorney, Agent, or Firm* — FIG.1 Patents

(57) ABSTRACT

Embodiments of the present disclosure are directed to a method and apparatus for power control of PUSCH repetition. A method according to an embodiment of the present application may include: receiving a mapping pattern and a configuration of a plurality of power control parameter sets for a physical uplink shared channel (PUSCH) transmission, which is configured to be transmitted in a plurality of time intervals repeatedly; receiving a downlink control information (DCI) for scheduling the PUSCH transmission, wherein the DCI includes a sounding reference signal resource indicator (SRI) field; determining a power of each PUSCH repetition of the PUSCH transmission based on at least one SRI value in the SRI field, the configuration of the plurality of power control parameter sets and the mapping pattern; and transmitting the PUSCH transmission in the plurality of (Continued)

time intervals repeatedly based on the determined power of each PUSCH repetition of the PUSCH transmission and the mapping pattern.

20 Claims, 6 Drawing Sheets

(51) Int. Cl.
*H04W 52/48* (2009.01)
*H04W 72/232* (2023.01)

(56) References Cited

U.S. PATENT DOCUMENTS

2010/0331037 A1* 12/2010 Jen ........................ H04L 1/1887 455/522
2017/0273027 A1* 9/2017 Kim .................... H04W 52/325
2018/0123744 A1* 5/2018 Nogami .............. H04W 52/248
2018/0146438 A1 5/2018 Yi et al.
2019/0037569 A1 1/2019 Lee et al.
2019/0044681 A1* 2/2019 Zhang ................... H04L 5/0048
2019/0281588 A1* 9/2019 Zhang ................... H04W 52/08
2019/0319823 A1* 10/2019 Akkarakaran ........ H04L 5/0053
2021/0159966 A1* 5/2021 Xi ....................... H04W 72/046
2021/0184812 A1* 6/2021 MolavianJazi ....... H04L 1/0041
2021/0194656 A1* 6/2021 Luo .......................... H04L 1/08
2021/0219241 A1* 7/2021 Wang .................... H04W 72/23
2021/0226680 A1* 7/2021 Khoshnevisan ...... H04B 7/0404
2021/0227474 A1* 7/2021 Khoshnevisan .... H04W 52/146
2021/0266843 A1* 8/2021 Abedini ................ H04W 52/54
2021/0367730 A1* 11/2021 Chen ..................... H04L 5/0051
2022/0174703 A1* 6/2022 Chai ..................... H04L 5/0094
2022/0312456 A1* 9/2022 Guo ...................... H04L 5/0053
2022/0369243 A1* 11/2022 Chen ......................... H04L 1/08
2022/0400471 A1* 12/2022 Hu ........................ H04W 72/23
2022/0417965 A1* 12/2022 Wang ................... H04B 7/0617
2023/0019570 A1* 1/2023 Guo ...................... H04L 5/0051
2023/0024738 A1* 1/2023 Khoshnevisan .... H04W 52/146
2023/0076139 A1* 3/2023 Muruganathan ...... H04W 16/28
2023/0093264 A1* 3/2023 Gao ...................... H04W 52/16 370/329
2023/0118905 A1* 4/2023 Go ....................... H04B 7/0456 370/329
2023/0171763 A1* 6/2023 Gao ...................... H04W 52/08 370/329
2023/0180134 A1* 6/2023 Liu ..................... H04W 52/242 455/522
2023/0189254 A1* 6/2023 Go ........................... H04B 7/06 370/329
2023/0209537 A1* 6/2023 Kang .................... H04L 1/1893 370/329
2023/0209567 A1* 6/2023 Grossmann ........... H04L 5/0051 370/329
2023/0254845 A1* 8/2023 Sun .................. H04W 72/1263
2023/0344555 A1* 10/2023 Yuan ......................... H04L 1/08
2024/0023086 A1* 1/2024 Sun ...................... H04B 7/0639

OTHER PUBLICATIONS

NR , "Physical layer procedures for data", 3rd GPP, Technical Specification Group Radio Access Network 3GPP TS 38.214 V16.1.0 [retrieved Sep. 19, 2022]. Retrieved from the Internet <https://portal.3gpp.org/desktopmodules/Specifications/SpecificationDetails.aspx?specificationId=3216>., Mar. 2020, 151 Pages.

OPPO , "Discussion on UL Reference Signals for NR Positioning", 3GPP TSG RAN WG1 #98bis, R1-1910122, Chongqing, China [retrieved Sep. 19, 2022]. Retrieved from the Internet <https://www.3gpp.org/ftp/tsg_ran/WG1_RL1/TSGR1_98b/Docs>., Oct. 2019, 6 Pages.

PCT/CN2020/086122 , "International Preliminary Report on Patentability", PCT Application No. PCT/CN2020/086122, Nov. 3, 2022, 5 pages.

PCT/CN2020/086122 , "International Search Report and Written Opinion", PCT Application No. PCT/CN2020/086122, Jan. 20, 2021, 6 pages.

202080098692.1 , "Foreign Office Action", CN Application No. 202080098692.1, Sep. 25, 2024, 14 pages.

Ericsson , "Introduction of MIMO enhancements", 3GPP TSG-RAN WG2 Meeting #109 electronic, R2-2001896, Electronic, Mar. 2020, 74 pages.

Mediatek Inc. , "CR for 38.331 for Power Savings", 3GPP TSG-RAN2 Meeting #109-e, R2-2002389, Online, Mar. 2020, 200 pages.

"Foreign Office Action", CN Application No. 202080098692.1, Apr. 2, 2025, 14 pages.

"Foreign Office Action", EP Application No. 209328727.7, Jun. 24, 2025, 6 pages.

* cited by examiner

METHOD AND APPARATUS FOR POWER CONTROL OF PUSCH REPETITION

TECHNICAL FIELD

Embodiments of the present disclosure generally relate to wireless communication technology, especially to a method and apparatus for power control of physical uplink shared channel (PUSCH) repetition.

BACKGROUND

There is a work item description (WID) approved on multiple-input multiple-output (MIMO) in New Radio (NR) Release 17 (R17) which includes a research topic, that is, identifying and specifying features to improve reliability and robustness for channels other than physical downlink shared channel (PDSCH) (that is, physical downlink control channel (PDCCH), PUSCH, and physical uplink control channel (PUCCH)) using multi-transmit-receive point (TRP) and/or multi-panel, with Release 16 (R16) reliability features as the baseline.

In some existing procedures, in order to improve reliability and robustness, a same PUSCH transmission may be repeatedly transmitted for several times. PUSCH repetitions of a PUSCH transmission with multiple beams/TRPs in multiple slots can utilize a spatial diversity of multiple beams/TRPs to increase the reliability and robustness, which will be studied and discussed in NR R17. Considering the PUSCH repetitions of the PUSCH transmission by using multiple beams may be received by multiple TRPs of a base station (BS), power control of the PUSCH repetitions should be different due to different links between a user equipment (UE) and different TRPs. Therefore, the power control of each PUSCH repetition with a different beam corresponding to a different TRP reception should be separately controlled and enhanced.

SUMMARY OF THE APPLICATION

Some embodiments of the present disclosure provide a method. The method may include receiving a mapping pattern and a configuration of a plurality of power control parameter sets for a physical uplink shared channel (PUSCH) transmission, which is configured to be transmitted in a plurality of time intervals repeatedly; receiving a downlink control information (DCI) for scheduling the PUSCH transmission, wherein the DCI includes a sounding reference signal resource indicator (SRI) field; determining a power of each PUSCH repetition of the PUSCH transmission based on at least one SRI value in the SRI field, the configuration of the plurality of power control parameter sets and the mapping pattern; and transmitting the PUSCH transmission in the plurality of time intervals repeatedly based on the determined power of each PUSCH repetition of the PUSCH transmission and the mapping pattern.

In an embodiment of the present application, each of the plurality of the power control parameter sets includes at least one of a power offset, a compensation factor, a pathloss reference RS, and a closed loop index.

In an embodiment of the present application, in the case of a plurality of SRI values being in the SRI field, each of the plurality of SRI values indicates a sounding reference signal (SRS) resource for codebook based transmission or an SRS resource subset for non-codebook based transmission.

In an embodiment of the present application, the configuration of the plurality of power control parameter sets includes a plurality of SRI-PUSCH-PowerControl lists, and each of the SRI-PUSCH-PowerControl lists includes at least one power control parameter set, and wherein a number of the SRI-PUSCH-PowerControl lists is the same as a number of the SRI values.

In an embodiment of the present application, the plurality of SRI-PUSCH-PowerControl lists include a first SRI-PUSCH-PowerControl list and a second SRI-PUSCH-PowerControl list, and the plurality of SRI values include a first SRI value and a second SRI value, and a first power control parameter set is indicated by mapping the first SRI value to the first SRI-PUSCH-PowerControl list and a second power control parameter set is indicated by mapping the second SRI value to the second SRI-PUSCH-PowerControl list.

In an embodiment of the present application, the DCI further includes a transmission power control (TPC) command field indicating at least one TPC command of at least one closed loop index respectively.

In an embodiment of the present application, the at least one TPC command includes a first TPC command and a second TPC command, the at least one closed loop index includes a first closed loop index and a second closed loop index, and the first TPC command corresponds to the first closed loop index and the second TPC command corresponds to the second closed loop index.

In an embodiment of the present application, the first power control parameter set and the second power parameter set are associated with the first TPC command and the second TPC command respectively, and the first closed loop index and the second closed loop index are included in the first power parameter set and the second power parameter set respectively.

In an embodiment of the present application, the mapping pattern indicates said each PUSCH repetition which the SRS resource for codebook based transmission or the SRS resource subset for non-codebook based transmission is associated with.

In an embodiment of the present application, determining the power of said each PUSCH repetition of the PUSCH transmission further includes: determining the power of each PUSCH repetition of the PUSCH transmission based on the power control parameter set associated with the SRI value which is associated with said each PUSCH repetition and a corresponding TPC command of the first TPC command and the second TPC command.

In another embodiment of the present disclosure, in the case of one SRI value being in the SRI field, and the SRI value indicates a plurality of SRS resources for codebook based transmission or a plurality of SRS resource subsets for non-codebook based transmission.

In another embodiment of the present disclosure, the SRI value further maps to one SRI-PUSCH-PowerControl list, and the configuration of the plurality of power control parameter sets includes the SRI-PUSCH-PowerControl list, wherein at least two of the plurality of power control parameter sets are configured for at least one SRI-PUSCH-PowerControl Id within the SRI-PUSCH-PowerControl list, and wherein a number of the indicated SRS resources for codebook based transmission or the indicated SRS resource subsets for non-codebook transmission is the same as a number of the configured power control parameter sets in the SRI-PUSCH-PowerControl Id where the SRI value is mapped.

In another embodiment of the present disclosure, the SRI value indicates two SRS resources for codebook based transmission or two SRS resource subsets for non-codebook based transmission, and in said SRI-PUSCH-PowerControl list, two power control parameter sets including a first power control parameter set and a second power control parameter set are configured for the SRI-PUSCH-PowerControl Id where the SRI value is mapped.

In another embodiment of the present disclosure, a first SRS resource of the two SRS resources for codebook based transmission or a first SRS resource subset of the two SRS resource subsets for non-codebook based transmission is associated with the first power control parameter set, and a second SRS resource of the two SRS resources for codebook based transmission or a second SRS resource subset of the two SRS resource subsets for non-codebook based transmission is associated with the second power control parameter set.

In another embodiment of the present disclosure, determining the power of each PUSCH repetition of the PUSCH transmission further includes: determining the power of each PUSCH repetition of the PUSCH transmission based on the power control parameter set associated with the SRS resource for codebook based transmission or the SRS resource subset for non-codebook based transmission indicated by said one SRI value which is associated with said each PUSCH repetition and a corresponding TPC command of the first TPC command and the second TPC command.

Some other embodiments of the present disclosure provide a method. The method may include: transmitting a mapping pattern and a configuration of a plurality of power control parameter sets for a physical uplink shared channel (PUSCH) transmission which is configured to be transmitted in a plurality of time intervals repeatedly; transmitting a DCI for scheduling the PUSCH transmission, wherein the DCI includes an SRI field; and receiving the PUSCH transmission in the plurality of time intervals repeatedly, wherein a power of each PUSCH repetition of the PUSCH transmission is determined based on at least one SRI value in the SRI field, the configuration of the plurality of power control parameter sets and the mapping pattern.

Some other embodiments of the present disclosure provide an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above methods with the at least one receiver, the at least one transmitter and the at least one processor.

The embodiments of the present disclosure can indicate a plurality power control parameter sets, and each PUSCH repetition's power can be determined by one of power control parameter sets and its associated TPC command according to the configured beam mapping pattern.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings.

A wireless communication system generally includes one or more BSs and one or more UEs. Furthermore, a BS may be configured with one TRP (or panel) or some TRPs (or panels). A TRP can act like a small BS. The TRPs can communicate with each other by a backhaul link. Such backhaul link may be an ideal backhaul link or a non-ideal backhaul link. In a wireless communication system, one single TRP can be used to serve one or more UEs under control of a BS. In different scenario, TRP may be called in different terms. Persons skilled in the art should understand that as the 3GPP and the communication technology develop, the terminologies recited in the specification may change, which should not affect the scope of the present disclosure. It should be understood that the TRP(s) (or panel(s)) configured for the BS may be transparent to a UE.

Figure 1:
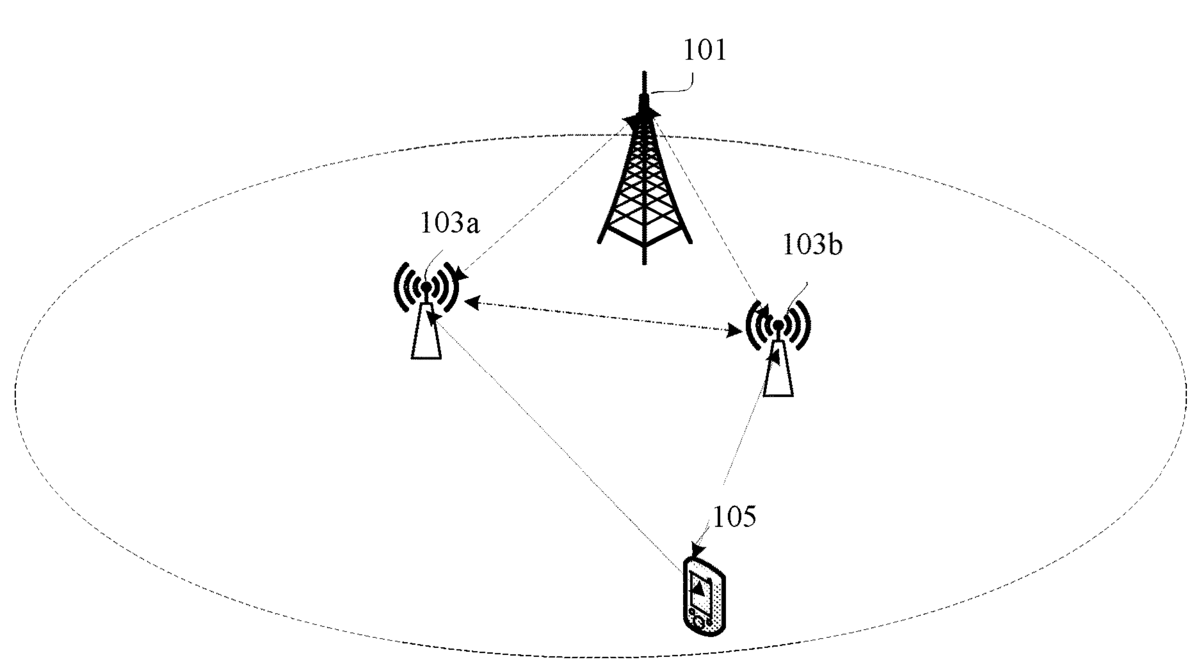
FIG. 1 is a schematic diagram illustrating an exemplary wireless communication system according to some embodiments of the present disclosure.

FIG. 1 is a schematic diagram illustrating an exemplary wireless communication system according to some embodiments of the present disclosure.

Referring to FIG. 1, a wireless communication system 100 may include a BS 101 and a UE 105. Furthermore, the BS 101 is further configured with two TRPs (e.g., TRP 103*a* and TRP 103*b*). Although only one BS, two TRPs, and one UE are shown for simplicity, it should be noted that the wireless communication system 100 may further include additional BSs, TRPs, and UEs.

The BS 101 may be a gNB in some scenarios (e.g. in 5G application scenario). The TRP 103*a* and TRP 103*b* may connect the BSs 101, via, for example, a backhaul link. Each TRP can serve the UE 105. As shown in FIG. 1, TRP 103*a* and TRP 103*b* can serve the UE 105 within a serving area or region (e.g., a cell or a cell sector). The TRP 103*a* and TRP 103*b* can communicate to each other via, for example, a backhaul link. It should be understood that the TRP 103*a* and TRP 103*b* configured for the BS 101 may be transparent to the UE 105.

In some embodiments of the present disclosure, the BS 101 may be distributed over a geographic region. In certain embodiments, the BS 101 may also be referred to as an access point, an access terminal, a base, a macro cell, a Node-B, an enhanced Node B (eNB), a gNB, a Home Node-B, a relay node, or any device described using other terminology used in the art.

The UE 105 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 105 may include wearable devices, such as smart watches, fitness bands, optical head-mounted displays, or the like. Moreover, the UE 105 may be referred to as a subscriber unit, a mobile phone, a mobile station, a user, a terminal, a mobile terminal, a wireless terminal, a fixed terminal, a subscriber station, a user terminal, or any device described using other terminology used in the art. The UE 105 may communicate directly with the BSs 102 via uplink communication signals.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G NR of the 3GPP protocol, wherein the BS 101 transmit data using an orthogonal frequency division multiplexing (OFDM) modulation scheme on the downlink and the UE 105 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BS 101 may communicate using other communication protocols, such as the IEEE 802.11 family of wireless communication protocols. Further, in some embodiments of the present application, the BS 101 may communicate over licensed spectrums, whereas in other embodiments, the BS 101 may communicate over unlicensed spectrums. The present application is not intended to be limited to the implementation of any particular wireless communication system architecture or protocol. In yet some embodiments of present application, the BS 101 may communicate with the UE 105 using the 3GPP 5G protocols.

As shown in FIG. 1, there are multiple links between the UE 105 and the TRPs 103*a* and 103*b*. The multiple links can be used for the UE 105 to transmit one or more PUSCH repetitions of a PUSCH transmission. Therefore, the power of a different link of a PUSCH repetition should be separately controlled and the power control of the PUSCH repetitions with multiple beams/TRPs should be enhanced.

In some embodiments, a sounding reference signal (SRS) is always configured within an SRS resource set consisting of one or more SRS resources. Several use cases have been identified for the SRS, and thus a radio resource control (RRC) configuration of an SRS resource set may contain a parameter called "usage". Depending on a value of the usage, the SRS resource set will have different configurations appropriate for the indicated use case, e.g., the number of allowed sets, the number of allowed resources per set, etc. The valid values of this parameter are antenna switching, codebook, non-codebook, and beam management.

According to Release 15 (R15) specification, there are two transmission schemes for a PUSCH transmission which are codebook based transmission and non-codebook based transmission. And both schemes of the PUSCH transmission are related to an SRS resource set whose usage is configured as 'codebook' or 'non-codebook'. For a codebook based PUSCH transmission scheme, a UE is configured to use one or more SRS resources for SRS transmission. Based on the transmitted SRS, a BS selects a preferred SRS resource. Then the BS indicates the preferred SRS resource with usage as 'codebook' in an SRS resource indicator (SRI) field of downlink control information (DCI) for scheduling a PUSCH transmission. For a non-codebook based PUSCH transmission scheme, the BS indicates a subset of SRS resources in a preferred SRS resource set with usage as 'non-codebook' in an SRI field of DCI for scheduling a PUSCH transmission.

Power control parameters for a PUSCH transmission are associated with the SRI value of the corresponding DCI. The power control procedure of a PUSCH transmission is drafted in TS 38.213 as follows:

7.1 Physical Uplink Shared Channel

For a PUSCH transmission on active UL BWP b, as described in Subclause 12, of carrier f of serving cell c, a UE first calculates a linear value $\hat{P}_{PUSCH,b,f,c}(i,j,q_d,l)$ of the transmit power $P_{PUSCH,b,f,c}(i,j,q_d,l)$, with parameters as defined in Subclause 7.1.1. For a PUSCH transmission scheduled by a DCI format 0_1 or configured by ConfiguredGrantConfig or semiPersistentOnPUSCH, if txConfig in PUSCH-Config is set to 'codebook' and each SRS resource in the SRS-ResourceSet with usage set to 'codebook' has more than one SRS port, the UE scales the linear value by the ratio of the number of antenna ports with a non-zero PUSCH transmission power to the maximum number of SRS ports supported by the UE in one SRS resource. The UE splits the power equally across the antenna ports on which the UE transmits the PUSCH with non-zero power.

7.1.1 UE Behaviour

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as $$P_{PUSCH,b,f,c}(i,j,q_d,l) = \min\left\{\begin{matrix} P_{CMAX,f,c}(i), \\ P_{O\_PUSCH,b,f,c}(j) + 10\log_{10}\left(2^{\mu}\cdot M_{RB,b,f,c}^{PUSCH}(i)\right) + \\ \alpha_{b,f,c}(j)\cdot PL_{b,f,c}(q_d) + \Delta_{TF,b,f,c}(i) + f_{b,f,c}(i,l) \end{matrix}\right\}[\text{dbm}]$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

$P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$.

If a UE is not provided P0-PUSCH-AlphaSet or for a PUSCH transmission scheduled by an RAR UL grant as described in Subclause 8.3, j=0, $P_{O\_UE\_PUSCH,b,f,c}(0)=0$, and $P_{O\_NOMINAL\_PUSCH,f,c}(0)=P_{O\_PRE}+\Delta_{PREAMBLE\_Msg3}$, where the parameter preambleReceivedTargetPower [11, TS 38.321] (for $P_{O\_PRE}$) and msg3-DeltaPreamble (for $\Delta_{PREAMBLE\_Msg3}$) are provided by higher layers, or $\Delta_{PREAMBLE\_Msg3}=0$ dB if msg3-DeltaPreamble is not provided, for carrier f of serving cell c For a PUSCH (re)transmission configured by ConfiguredGrantConfig, j=1, $P_{O\_NOMINAL\_PUSCH,f,c}(1)$ is provided by p0-NominalWithoutGrant, or $P_{O\_NOMINAL\_PUSCH,f,c}(1)-P_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell c For $j \in \{2, \ldots, J-1\}=S_J$, a $P_{O\_NOMINAL\_PUSCH,f,c}(j)$ value, applicable for all $j \in S_J$, is provided by p0-NominalWithGrant, or $P_{O\_NOMINAL\_PUSCH,f,c}(j)=P_{O\_NOMINAL\_PUSCH,f,c}(0)$ if p0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c If the UE is provided by SRI-PUSCH-PowerControl more than one values of p0-PUSCH-AlphaSetId and if DCI format 0_1 includes an SRI field, the UE obtains a mapping from sri-PUSCH-PowerControlId in SRI-PUSCH-PowerControl between a set of values for the SRI field in DCI format 0_1 [5, TS 38.212] and a set of indexes provided by p0-PUSCH-AlphaSetId that map to a set of P0-PUSCH-AlphaSet values. If the PUSCH transmission is scheduled by a DCI format 0_1 that includes an SRI field, the UE determines the value of $P_{O\_UE\_PUSCH,b,f,c}(j)$ from the p0-PUSCH-AlphaSetId value that is mapped to the SRI field value If the PUSCH transmission is scheduled by a DCI format 0_0 or by a DCI format 0_1 that does not include an SRI field, or if SRI-PUSCHPowerControl is not provided to the UE, j=2, and the UE determines $P_{O\_UE\_PUSCH,b,f,c}(j)$ from the value of the first P0-PUSCH-AlphaSet in p0-AlphaSets For $\alpha_{b,f,c}(j)$ For j=0, $\alpha_{b,f,c}(0)$ is a value of msg3-Alpha, when provided; otherwise, $\alpha_{b,f,c}(0)=1$ For j=1, $\alpha_{b,f,c}(1)$ is provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c For $j \in S_J$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId, and if DCI format 0_1 includes an SRI field, the UE obtains a mapping from sri-PUSCH-PowerControlId in SRI-PUSCH-PowerControl between a set of values for the SRI field in DCI format 0_1 [5, TS 38.212] and a set of indexes provided by p0-PUSCH-AlphaSetId that map to a set of P0-PUSCH-AlphaSet values. If the PUSCH transmission is scheduled by a DCI format 0_1 that includes an SRI field, the UE determines the values of $\alpha_{b,f,c}(j)$ from the p0-PUSCH-AlphaSetId value that is mapped to the SRI field value If the PUSCH transmission is scheduled by a DCI format 0_0 or by a DCI format 0_1 that does not include an SRI field, or if SRI-PUSCH-PowerControl is not provided to the UE, j=2, and the UE determines $\alpha_{b,f,c}(j)$ from the value of the first P0-PUSCH-AlphaSet in p0-AlphaSets $$M_{RB,b,f,c}^{PUSCH}(i)$$

is the bandwidth of the PUSCH resource assignment expressed in number of resource blocks for PUSCH transmission occasion i on active UL BWP b of carrier f of serving cell c and μ is an SCS configuration defined in [4, TS 38.211]

$PL_{b,f,c}(q_d)$ is a downlink pathloss estimate in dB calculated by the UE using reference signal (RS) index $q_d$ for the active DL BWP, as described in Subclause 12, of carrier f of serving cell c If the UE is not provided PUSCH-PathlossReferenceRS or before the UE is provided dedicated higher layer parameters, the UE calculates $PL_{b,f,c}(q_d)$ using an RS resource from the SS/PBCH block that the UE uses to obtain MIB If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to an SS/PBCH block index, and a set of CSI-RS resource indexes, each provided by csi-RS-Index when a value of a corresponding pusch-PathlossReferenceRS-Id maps to a CSI-RS resource index. The UE identifies an RS resource index $q_d$ in the set of RS resource indexes to correspond either to an SS/PBCH block index or to a CSI-RS resource index as provided by pusch-PathlossReferenceRS-Id in PUSCH-PathlossReferenceRS If the PUSCH transmission is scheduled by an RAR UL grant as described in Subclause 8.3, the UE uses the same RS resource index $q_d$ as for a corresponding PRACH transmission If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in DCI format 0_1 and a set of PUSCH-PathlossReferenceRS-Id values. If the PUSCH transmission is scheduled by a DCI format 0_1 that includes an SRI field, the UE determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking If the PUSCH transmission is scheduled by a DCI format 0_0, and if the UE is provided a spatial setting by PUCCH-SpatialRelationInfo for a PUCCH resource with a lowest index for active UL BWP b of each carrier f and serving cell c, as described in Subclause 9.2.2, the UE uses the same RS resource index $q_d$ as for a PUCCH transmission in the PUCCH resource with the lowest index If the PUSCH transmission is scheduled by a DCI format 0_0 and if the UE is not provided a spatial setting for a PUCCH transmission, or by a DCI format 0_1 that does not include an SRI field, or if SRI-PUSCH-PowerControl is not provided to the UE, the UE determines an RS resource index $q_d$ with a respective PUSCH-PathlossReferenceRS-Id value being equal to zero where the RS resource is either on serving cell c or, if provided, on a serving cell indicated by a value of pathlossReferenceLinking For a PUSCH transmission configured by ConfiguredGrantConfig, if rrc-ConfiguredUplinkGrant is included in ConfiguredGrantConfig, an RS resource index $q_d$ is provided by a value of pathlossReferenceIndex included in rrc-ConfiguredUplinkGrant where the RS resource is either on serving cell c or, if provided, on a serving cell indicated by a value of pathlossReferenceLinking For a PUSCH transmission configured by ConfiguredGrantConfig that does not include rrc-ConfiguredUplinkGrant, the UE determines an RS resource index $q_d$ from a value of PUSCH-PathlossReferenceRS-Id that is mapped to an SRI field value in a DCI format activating the PUSCH transmission. If the DCI format activating the PUSCH transmission does not include an SRI field, the UE determines an RS resource index $q_d$ with a respective PUSCH-PathlossReferenceRS-Id value being equal to zero where the RS resource is either on serving cell c or, if provided, on a serving cell indicated by a value of pathlossReferenceLinking $PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-BlockPower. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

$$\Delta_{TF,b,f,c}(i) = 10\log_{10}\left(\left(2^{BPRE\cdot K_s} - 1\right)\cdot \beta_{offset}^{PUSCH}\right)$$

for $K_S$=1.25 and $\Delta_{TF,b,f,c}(i)$=0 for $K_S$=0 where $K_S$ is provided by deltaMCS for each UL BWP b of each carrier f and serving cell c. If the PUSCH transmission is over more than one layer [6, TS 38.214], $\Delta_{TF,b,f,c}(i)$=0. BPRE and $$\beta_{offset}^{PUSCH},$$

for active UL BWP b of each carrier f and each serving cell c, are computed as below $$-BPRE = \sum_{r=0}^{C-1} K_r / N_{RE}$$

for PUSCH with UL-SCH data and $$BPRE = Q_m \cdot R / \beta_{offset}^{PUSCH}$$

for CSI transmission in a PUSCH without UL-SCH data, where c is a number of transmitted code blocks, $K_r$ is a size for code block r, and $N_{RE}$ is a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

where $$M_{symb,b,f,c}^{PUSCH}(i)$$

is a number of symbols for PUSCH transmission occasion i on active UL BWP b of carrier f of serving cell c, $$N_{sc,data}^{RB}(i, j)$$

is a number of subcarriers excluding DM-RS subcarriers and phase-tracking RS samples [4, TS 38.211] in PUSCH symbol j, $$0 \le j < N_{symb,b,f,c}^{PUSCH}(i),$$

and c, $K_r$ are defined in [5, TS 38.212]

$$\beta_{offset}^{PUSCH} = 1$$

when the PUSCH includes UL-SCH data and $$\beta_{offset}^{PUSCH} = \beta_{offset}^{CSI,1},$$

as described in Subclause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data For the PUSCH power control adjustment state $f_{b,f,c}(i,l)$ for active UL BWP b of carrier f of serving cell C in PUSCH transmission occasion i $\delta_{PUSCH,b,f,c}(i,l)$ is a TPC command value included in a DCI format 0_0 or DCI format 0_1 that schedules the PUSCH transmission occasion i on active UL BWP b of carrier f of serving cell c or jointly coded with other TPC commands in a DCI format 2_2 with CRC scrambled by TPC-PUSCH-RNTI, as described in Subclause 11.3

$l \in \{0,1\}$ if the UE is configured with twoPUSCH-PC-AdjustmentStates and l=0 if the UE is not configured with twoPUSCH-PC-AdjustmentStates or if the PUSCH transmission is scheduled by an RAR UL grant as described in Subclause 8.3

For a PUSCH (re)transmission configured by ConfiguredGrantConfig, the value of $l \in \{0,1\}$ is provided to the UE by powerControlLoopToUse If the UE is provided SRI-PUSCH-PowerControl, the UE obtains a mapping between a set of values for the SRI field in DCI format 0_1 and the 1 value(s) provided by sri-PUSCH-ClosedLoopIndex. If the PUSCH transmission is scheduled by a DCI format 0_1 and if DCI format 0_1 includes an SRI field, the UE determines the 1 value that is mapped to the SRI field value If the PUSCH transmission is scheduled by a DCI format 0_0 or by a DCI format 0_1 that does not include an SRI field, or if an SRI-PUSCH-PowerControl is not provided to the UE, l=0

If the UE obtains one TPC command from a DCI format 2_2 with CRC scrambled by a TPC-PUSCH-RNTI, the 1 value is provided by the closed loop indicator field in DCI format 2_2

$$-f_{b,f,c}(i,l) = f_{b,f,c}(i-i_0,l) + \sum_{m=0}^{C(D_i)-1} \delta_{PUSCH,b,f,c}(m,l)$$

is the PUSCH power control adjustment state 1 for active UL BWP b of carrier f of serving cell c and PUSCH transmission occasion i if the UE is not provided tpc-Accumulation, where The $\delta_{PUSCH,b,f,c}$ values are given in Table 7.1.1-1

$$-\sum_{m=0}^{C(D_i)-1} \delta_{PUSCH,b,f,c}(m,l)$$

is a sum of TPC command values in a set $D_i$ of TPC command values with cardinality $c(D_i)$ that the UE receives between $K_{PUSCH}(i-i_0)-1$ symbols before PUSCH transmission occasion $i-i_0$, and $K_{PUSCH}(i)$ symbols before PUSCH transmission occasion i on active UL BWP b of carrier f of serving cell c for PUSCH power control adjustment state l, where $i_0>0$ is the smallest integer for which $K_{PUSCH}(i-i_0)$ symbols before PUSCH transmission occasion $i-i_0$, is earlier than $K_{PUSCH}(i)$ symbols before PUSCH transmission occasion i If a PUSCH transmission is scheduled by a DCI format 0_0 or DCI format 0_1, $K_{PUSCH}(i)$ is a number of symbols for active UL BWP b of carrier f of serving cell c after a last symbol of a corresponding PDCCH reception and before a first symbol of the PUSCH transmission If a PUSCH transmission is configured by ConfiguredGrantConfig, $K_{PUSCH}(i)$ is a number of $K_{PUSCH,min}$ symbols equal to the product of a number of symbols per slot, $$N_{symb}^{slot},$$

and the minimum of the values provided by k2 in PUSCH-ConfigCommon for active UL BWP b of carrier f of serving cell c If the UE has reached maximum power for active UL BWP b of carrier f of serving cell c at PUSCH transmission occasion $i-i_0$ and $$\sum_{m=0}^{C(D_i)-1} \delta_{PUSCH,b,f,c}(m,l) \geq 0,$$

then $f_{b,f,c}(i,l)=f_{b,f,c}(i-i_0,l))$

If UE has reached minimum power for active UL BWP b of carrier f of serving cell c at PUSCH transmission occasion $i-i_0$ and $$\sum_{m=0}^{C(D_i)-1} \delta_{PUSCH,b,f,c}(m,l) \leq 0,$$

then $f_{b,f,c}(i,l)=f_{b,f,c}(i-i_0,l)$

A UE resets accumulation of a PUSCH power control adjustment state l for active UL BWP b of carrier f of serving cell c to $f_{b,f,c}(k,l)=0$, k=0, 1, . . . , i If a configuration for a corresponding $P_{O\_UE\_PUSCH,b,f,c}(j)$ value is provided by higher layers If a configuration for a corresponding $a_{b,f,c}(j)$ value is provided by higher layers If j>1 and the PUSCH transmission is scheduled by a DCI format 0_1 that includes an SRI field, and the UE is provided higher SRI-PUSCH-PowerControl, the UE determines the value of l from the value of j based on an indication by the SRI field for an sri-PUSCH-PowerControlId value associated with the sri-P0-PUSCH-AlphaSetId value corresponding to j and with the sri-PUSCH-ClosedLoopIndex value corresponding to l If j>1 and the PUSCH transmission is scheduled by a DCI format 0_0 or by a DCI format 0_1 that does not include an SRI field or the UE is not provided SRI-PUSCH-PowerControl, l=0

If j=1, 1 is provided by the value of powerControlLoopToUse $f_{b,f,c}(i,l)=\delta_{PUSCH,b,f,c}(i,l)$ is the PUSCH power control adjustment state for active UL BWP b of carrier f of serving cell c and PUSCH transmission occasion i if the UE is provided tpc-Accumulation, where $\delta_{PUSCH,b,f,c}$ absolute values are given in Table 7.1.1-1

If the UE receives a random access response message in response to a PRACH transmission on active UL BWP b of carrier f of serving cell c as described in Subclause 8

$f_{b,f,c}(0,l)=\Delta P_{rampup,b,f,c}+\delta_{msg2,b,f,c}$, where l=0 and $\delta_{msg2,b,f,c}$ is a TPC command value indicated in the random access response grant of the random access response message corresponding to the PRACH transmission on active UL BWP b of carrier f in the serving cell c, and $$-\Delta P_{rampup,b,f,c} = \min\left[\left\{\max\left(0, P_{CMAX,f,c} - \left(\begin{array}{c}10\log_{10}\left(2^{\mu}\cdot M_{RB,b,f,c}^{PUSCH}(0)\right)+\\ P_{O\_PUSCH,b,f,c}(0)+\alpha_{b,f,c}(0)\cdot PL_c+\\ \Delta_{TF,b,f,c}(0)+\delta_{msg2,b,f,c}\end{array}\right)\right)\right\}, \Delta P_{rampuprequested,b,f,c}\right]$$

and $\Delta P_{rampuprequested,b,f,c}$ is provided by higher layers and corresponds to the total power ramp-up requested by higher layers from the first to the last random access preamble for carrier f in the serving cell c, $M_{RB,b,f,c}^{PUSCH}(0)$ is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c.

Table 7.1.1-1 shows mapping of TPC Command Field in DCI format 0_0, DCI format 0_1, or DCI format 2_2, with CRC scrambled by TPC-PUSCH-RNTI, or DCI format 2_3, to absolute and accumulated $\delta_{PUSCH,b,f,c}$ values or $\delta_{SRS,b,f,c}$ values.

TABLE 7.1.1-1

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

It should be noted that if there is SRI field in the corresponding DCI, a power control parameter set including p0-PUSCH, alpha, PUSCH pathloss reference RS and closed loop index is indicated by the mapping between the SRI and SRI-PUSCH-PowerControl. Therefore, each SRI is associated with a power control parameter set.

PUSCH power control information is transmitted by RRC signaling, and the RRC signaling of PUSCH power control is drafted in TS 38.331 as follows.

```
PUSCH-PowerControl ::=              SEQUENCE {
  tpc-Accumulation                    ENUMERATED { disabled }
OPTIONAL, -- Need S
  msg3-Alpha                          Alpha
OPTIONAL, -- Need S
  p0-NominalWithoutGrant              INTEGER (−202..24)
OPTIONAL, -- Need M
  p0-AlphaSets                        SEQUENCE (SIZE
(1..maxNrofP0-PUSCH-AlphaSets)) OF P0-PUSCH-AlphaSet   OPTIONAL, -- Need M
  pathlossReferenceRSToAddModList   SEQUENCE (SIZE
(1..maxNrofPUSCH-PathlossReferenceRSs)) OF PUSCH-PathlossReferenceRS
OPTIONAL, -- Need N
  pathlossReferenceRSToReleaseList   SEQUENCE (SIZE
(1..maxNrofPUSCH-PathlossReferenceRSs)) OF PUSCH-PathlossReferenceRS-Id
OPTIONAL, --Need N
  twoPUSCH-PC-AdjustmentStates        ENUMERATED {twoStates}
OPTIONAL, -- Need S
  deltaMCS                            ENUMERATED {enabled}
OPTIONAL, -- Need S
  sri-PUSCH-MappingToAddModList       SEQUENCE (SIZE
(1..maxNrofSRI-PUSCH-Mappings)) OF SRI-PUSCH-PowerControl
OPTIONAL, -- Need N
  sri-PUSCH-MappingToReleaseList      SEQUENCE (SIZE
(1..maxNrofSRI-PUSCH-Mappings)) OF SRI-PUSCH-PowerControlId
OPTIONAL -- Need N
}
P0-PUSCH-AlphaSet ::=               SEQUENCE {
  p0-PUSCH-AlphaSetId                 P0-PUSCH-AlphaSetId,
  p0                                  INTEGER (−16..15)
OPTIONAL, -- Need S
  alpha                               Alpha
OPTIONAL -- Need S
```

-continued

```
}
P0-PUSCH-AlphaSetId ::=          INTEGER (0..maxNrofP0-PUSCH-AlphaSets-1)
PUSCH-PathlossReferenceRS ::=    SEQUENCE {
  pusch-PathlossReferenceRS-Id     PUSCH-PathlossReferenceRS-Id,
  referenceSignal                  CHOICE {
    ssb-Index                        SSB-Index,
    csi-RS-Index                     NZP-CSI-RS-ResourceId
  }
}
PUSCH-PathlossReferenceRS-Id ::=  INTEGER
(0..maxNrofPUSCH-PathlossReferenceRSs-1)
SRI-PUSCH-PowerControl ::=       SEQUENCE {
  sri-PUSCH-PowerControlId           SRI-PUSCH-PowerControlId,
  sri-PUSCH-PathlossReferenceRS-Id   PUSCH-PathlossReferenceRS-Id,
  sri-P0-PUSCH-AlphaSetId            P0-PUSCH-AlphaSetId,
  sri-PUSCH-ClosedLoopIndex          ENUMERATED { i0, i1 }
}
```

In R16, PDSCH repetitions with multiple beams have already been supported in the single DCI based multiple TRPs case, which implies that the backhaul of multiple TRPs is ideal or almost ideal. In the present application, we consider that PUSCH repetitions with multiple beams also works in the single DCI based multiple TRPs case.

In order to support PUSCH repetitions with multiple beams, the SRI field in the DCI should indicate multiple beams associated with multiple SRS resources for codebook based transmission or multiple SRS resource subsets for non-codebook based transmission for a PUSCH transmission. It is agreed in R17 that a UE can be implemented with multiple panels which can transmit multiple beams but only one panel can be used in a time interval considering the power consumption, which means only one beam can be used to transmit a PUSCH transmission at a time. And we assume that multiple SRS resource sets can be configured with the usage set to 'codebook' or 'non-codebook' where each SRS resource set can be associated with a panel.

In the present application, two schemes may be adopted to indicate multiple beams associated with multiple SRS resources for codebook based transmission or multiple SRS resource subsets for non-codebook based transmission in the SRI field of the DCI, and two schemes may be adopted to determine power control parameters accordingly. Similar to PDSCH repetition in multiple slots in R16, a mapping pattern (or called a beam mapping pattern) will be configured to indicate which beam to use for which PUSCH repetition.

Figure 2:
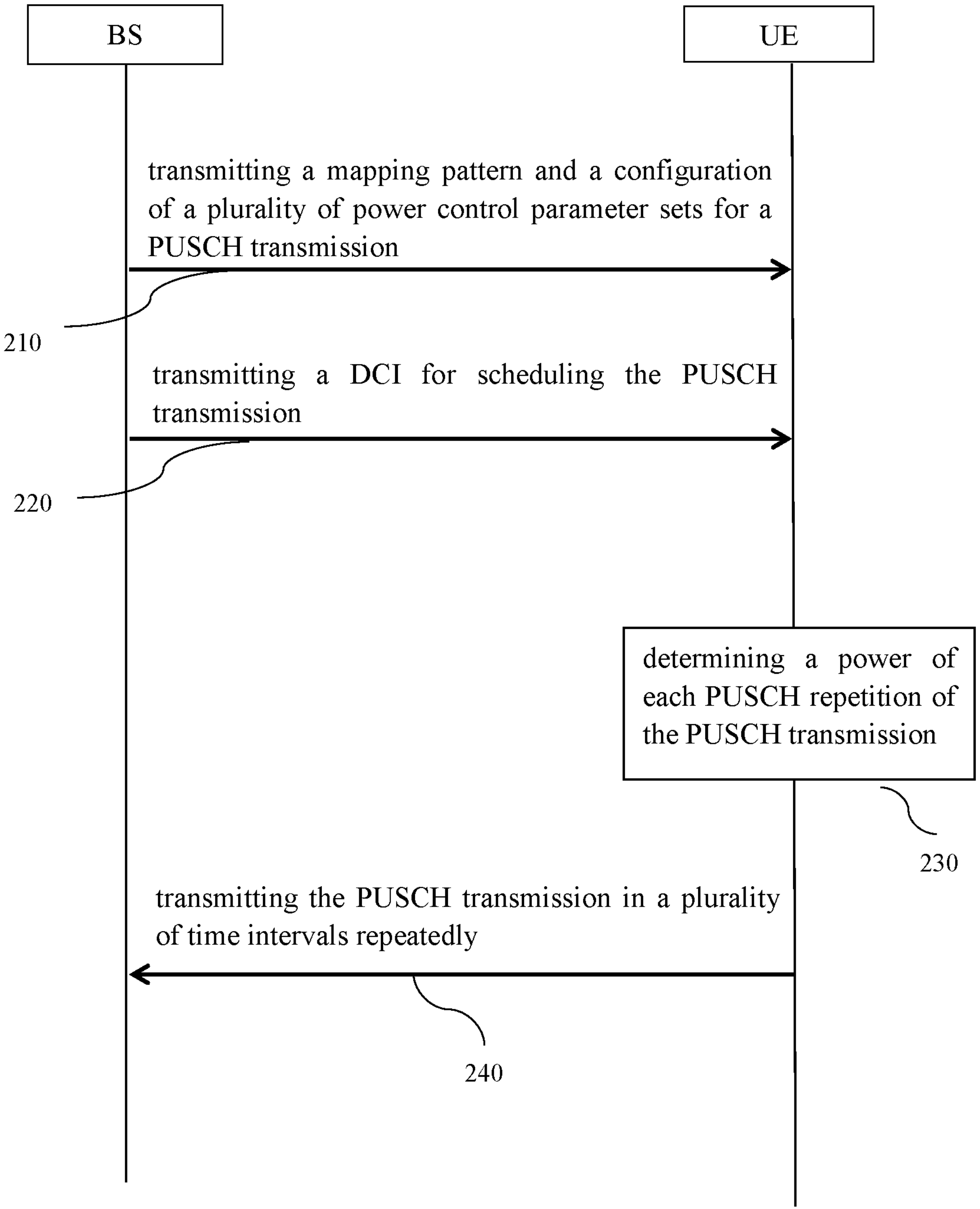
FIG. 2 is an exemplary flow chart illustrating a method for power control of PUSCH repetition according to some embodiments of the present application.

FIG. 2 is an exemplary flow chart illustrating a method for power control of PUSCH repetition according to some embodiments of the present application.

As shown in FIG. 2, in step 210, a BS may transmit a mapping pattern and a configuration of a plurality of power control parameter sets for a PUSCH transmission which is configured to be transmitted in a plurality of time intervals repeatedly. The BS may transmit the mapping pattern and the configuration of the plurality of power control parameter sets for the PUSCH transmission by a higher layer signaling, for example, an RRC signaling. The power control parameter set may include at least one of a power offset, a compensation factor, a pathloss reference RS, and a closed loop index. More details on the RRC signaling of the configuration of the plurality of power control parameter sets will be illustrated later.

In step 220, the BS transmits a DCI for scheduling the PUSCH transmission. The DCI may include an SRI field. In an embodiment, the SRI field may include only one SRI value. In another embodiment, the SRI field may include a plurality of SRI values.

Furthermore, the DCI for scheduling the PUSCH transmission may further include a TPC command field. In an embodiment, the TPC command field may indicate one TPC command of one closed loop index. In another embodiment, the TPC command field may indicate a plurality of TPC commands of a plurality of closed loop indexes, and a TCP command of the TPC commands may correspond to a corresponding closed loop index of the closed loop indexes.

After receiving the configuration of the plurality of power control parameter sets and the DCI for the PUSCH transmission, then in step 230, the UE may determine a power of each PUSCH repetition of the PUSCH transmission based on the SRI value(s) in the SRI field, the TPC command field, the configuration of the plurality of power control parameter sets and the mapping pattern.

And then in step 240, the UE may transmit the PUSCH transmission in a plurality of time intervals repeatedly based on the determined power of each PUSCH repetition of the PUSCH transmission and the received mapping pattern.

In an embodiment of the present application, in the case that a plurality of SRI values are included in the SRI field, each SRI value indicates an SRS resource for codebook based transmission or an SRS resource subset for non-codebook based transmission. The configuration of the plurality of power control parameter sets includes a plurality of SRI-PUSCH-PowerControl lists, each of the SRI-PUSCH-PowerControl lists includes a power control parameter set, and the number of the SRI-PUSCH-PowerControl lists is the same as the number of the SRI values.

Furthermore, the mapping pattern may indicate each PUSCH repetition which the SRS resource for codebook based transmission or the SRS resource subset for non-codebook based transmission is associated with. Accordingly, the UE may determine the power of each PUSCH repetition of the PUSCH transmission based on the power control parameter set associated with the corresponding SRI value and the corresponding TPC command.

In another embodiment of the present application, in the case that one SRI value is included in the SRI field, the SRI value may indicate a plurality of SRS resources for codebook based transmission or a plurality of SRS resource subsets for non-codebook based transmission.

Besides the SRS resources or the SRS resource subsets, the SRI value may further map to one SRI-PUSCH-PowerControl list, and the configuration of the plurality of power control parameter sets includes the SRI-PUSCH-PowerControl list. A plurality of power control parameter sets may be configured for at least one SRI-PUSCH-PowerControl Id within the SRI-PUSCH-PowerControl list. That is, in the SRI-PUSCH-PowerControl list, there are one or more SRI-PUSCH-PowerControl Ids, and for the SRI-PUSCH-PowerControl Id(s), a plurality of power control parameter sets may be configured. The number of the indicated SRS resources for codebook based transmission or the indicated SRS resource subsets for non-codebook transmission is the same as the number of the configured power control parameter sets, which is configured for the SRI-PUSCH-PowerControl Id where the SRI value is mapped.

The mapping pattern may indicate each PUSCH repetition which the SRS resource for codebook based transmission or the SRS resource subset for non-codebook based transmission is associated with. Accordingly, the UE may determine the power of each PUSCH repetition of the PUSCH transmission based on the power control parameter set associated with the SRS resource for codebook based transmission or the SRS resource subset for non-codebook based transmission indicated by the SRI value which each PUSCH repetition is associated with and the corresponding TPC command.

Scenarios of power control of PUSCH repetition are provided as below for illustrative purpose according to some embodiments of the present application in connection with FIGS. 3 and 4 by taking 2 beams of the UE for transmitting a PUSCH transmission with multiple repetitions.

Figure 3:
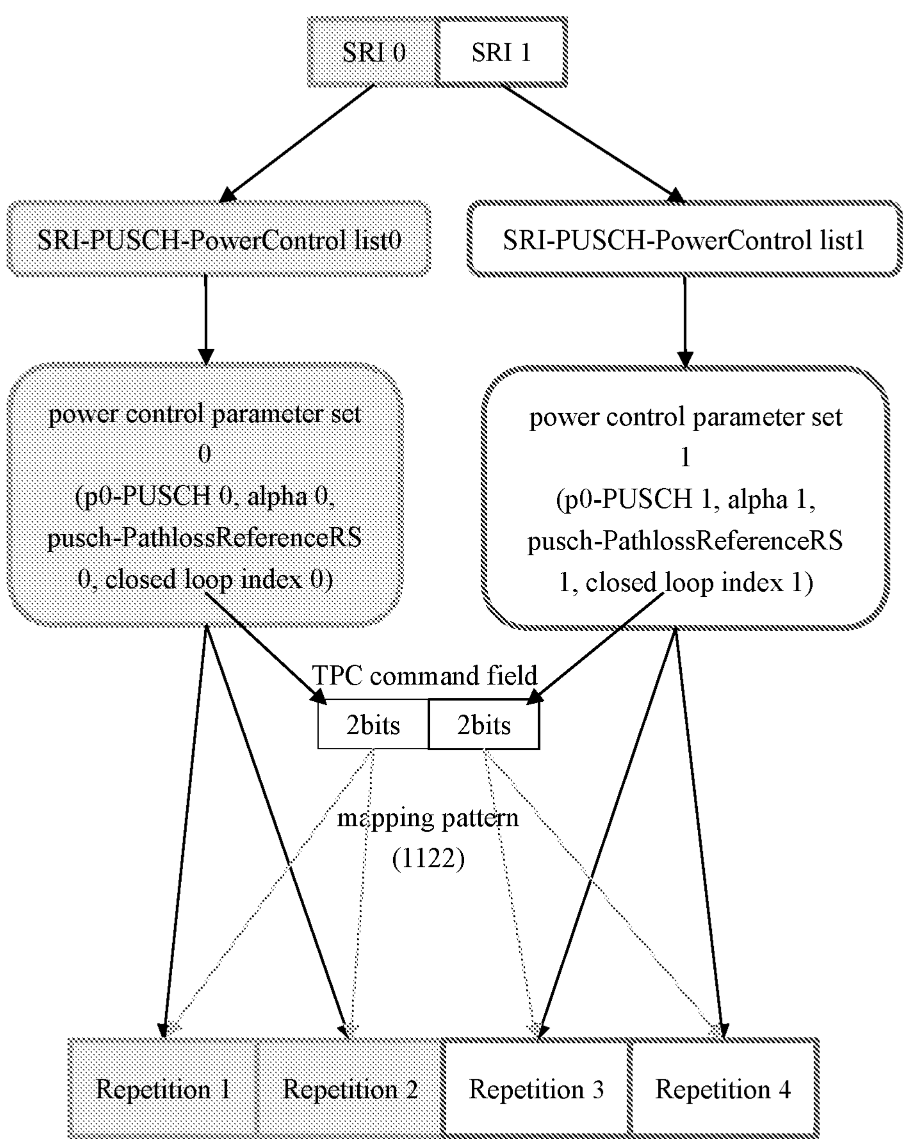
FIG. 3 illustrates an exemplary scenario of power control of PUSCH repetition according to an embodiment of the present disclosure.

FIG. 3 illustrates an exemplary scenario of power control of PUSCH repetition according to an embodiment of the present disclosure.

In this exemplary scenario, it is assumed that a PUSCH transmission is configured to be transmitted repeatedly in 4 slots.

As shown in FIG. 3, a UE may receive a DCI for scheduling a PUSCH transmission, and the DCI includes an SRI field. In the SRI filed, there are two SRI values, e.g., SRI 0 and SRI 1 as shown in FIG. 3. Each SRI value indicates an SRS resource for codebook based transmission or an SRS resource subset for non-codebook based transmission. It should be understood that two SRI values being in the SRI field is just an example, and persons skilled in the art would appreciate that more than two number of SRI values can also be used according to actual situations or needs.

For codebook based PUSCH transmission, two SRS resources with usage set to "codebook" can be configured. In this exemplary scenario, SRI 0 may indicate a first SRS resource of a first SRS resource set associated with some PUSCH repetitions, and SRI 1 may indicate a second SRS resource of a second SRS resource set associated with some other PUSCH repetitions.

For non-codebook based PUSCH transmission, two SRS resources sets with usage set to "non-codebook" can be configured. In this exemplary scenario, SRI 0 may indicate a first SRS resource subset of a first SRS resource set associated with some PUSCH repetitions, and SRI 1 may indicate a second SRS resource subset of a second SRS resource set associated with some other PUSCH repetitions.

Accordingly, for codebook based PUSCH transmission or non-codebook based PUSCH transmission, two SRI-PUSCH-PowerControl lists including a first SRI-PUSCH-PowerControl list and a second SRI-PUSCH-PowerControl list may be configured for the UE. That is, the number of the SRI-PUSCH-PowerControl lists is the same as the number of the SRI values.

A first power control parameter set may be indicated by mapping SRI 0 to the first SRI-PUSCH-PowerControl list, and a second power control parameter set may be indicated by mapping SRI 1 to the second SRI-PUSCH-PowerControl list. In particular, SRI 0 is mapped to the first SRI-PUSCH-PowerControl list, e.g., SRI-PUSCH-PowerControl list 0, to determine a first power control parameter set, e.g., power control parameter set 0; and SRI 1 is mapped to a second SRI-PUSCH-PowerControl list, e.g., SRI-PUSCH-PowerControl list 1, to determine a second power control parameter set, e.g., power control parameter set 1.

The SRI-PUSCH-PowerControl list may include one or more power control parameter sets. Similar to R15, a power control parameter set is composed of P0 (power offset), alpha (compensation factor), pathloss reference RS and closed loop index. And RRC configuration signaling in TS 38.331 may be updated as follows where two SRI-PUSCH-PowerControl lists are configured in PUSCH-PowerControl.

```
PUSCH-PowerControl ::=             SEQUENCE {
  tpc-Accumulation                   ENUMERATED { disabled }
OPTIONAL, -- Need S
  msg3-Alpha                          Alpha
OPTIONAL, -- Need S
  p0-NominalWithoutGrant             INTEGER (−202..24)
OPTIONAL, -- Need M
  p0-AlphaSets                        SEQUENCE (SIZE
(1..maxNrofP0-PUSCH-AlphaSets)) OF P0-PUSCH-AlphaSet
OPTIONAL, -- Need M
  pathlossReferenceRSToAddModList   SEQUENCE (SIZE
(1..maxNrofPUSCH-PathlossReferenceRSs)) OF PUSCH-
PathlossReferenceRS
OPTIONAL, -- Need N
  pathlossReferenceRSToReleaseList    SEQUENCE (SIZE
(1..maxNrofPUSCH-PathlossReferenceRSs)) OF PUSCH-
PathlossReferenceRS-Id
OPTIONAL, -- Need N
  twoPUSCH-PC-AdjustmentStates       ENUMERATED {twoStates}
OPTIONAL, -- Need S
  deltaMCS                            ENUMERATED {enabled}
OPTIONAL, -- Need S
  sri-PUSCH-MappingToAddModList      SEQUENCE (SIZE
(1..maxNrofSRI-PUSCH-Mappings)) OF SRI-PUSCH-PowerControl
OPTIONAL, -- Need N
  sri-PUSCH-MappingToReleaseList     SEQUENCE (SIZE
(1..maxNrofSRI-PUSCH-Mappings)) OF SRI-PUSCH-PowerControlId
OPTIONAL -- Need N
  sri-PUSCH-MappingToAddModList1     SEQUENCE (SIZE
(1..maxNrofSRI-PUSCH-Mappings)) OF SRI-PUSCH-PowerControl
OPTIONAL, -- Need N
  sri-PUSCH-MappingToReleaseList1    SEQUENCE (SIZE
(1..maxNrofSRI-PUSCH-Mappings)) OF SRI-PUSCH-PowerControlId
OPTIONAL -- Need N
}
P0-PUSCH-AlphaSet ::=              SEQUENCE {
  p0-PUSCH-AlphaSetId                 P0-PUSCH-AlphaSetId,
  p0                                  INTEGER (−16..15)
OPTIONAL, -- Need S
  alpha                               Alpha
OPTIONAL -- Need S
}
P0-PUSCH-AlphaSetId ::=            INTEGER
(0..maxNrofP0-PUSCH-AlphaSets-1)
PUSCH-PathlossReferenceRS ::=    SEQUENCE {
  pusch-PathlossReferenceRS-Id      PUSCH-PathlossReferenceRS-Id,
  referencesignal                   CHOICE {
    ssb-Index                          SSB-Index,
    csi-RS-Index                       NZP-CSI-RS-ResourceId
  }
}
PUSCH-PathlossReferenceRS-Id ::=  INTEGER
(0..maxNrofPUSCH-PathlossReferenceRSs-1)
SRI-PUSCH-PowerControl ::=          SEQUENCE {
  sri-PUSCH-PowerControlId            SRI-PUSCH-PowerControlId,
  sri-PUSCH-PathlossReferenceRS-Id  PUSCH-PathlossReferenceRS-Id,
  sri-P0-PUSCH-AlphaSetId             P0-PUSCH-AlphaSetId,
  sri-PUSCH-ClosedLoopIndex           ENUMERATED { i0, i1 }
}
```

As shown in FIG. 3, SRI 0 is associated with the power control parameter set 0, which includes p0-PUSCH 0, alpha 0, pusch-PathlossReferenceRS 0 and closed loop index 0 of SRI-PUSCH-PowerControl list 0. SRI 1 is associated with the power control parameter set 1, which includes fields: p0-PUSCH 1, alpha 1, pusch-PathlossReferenceRS 1 and closed loop index 1 of SRI-PUSCH-PowerControl list 1.

In this exemplary scenario, as shown in FIG. 3, there are 4 bits in the TPC command field of the DCI. The first 2 bits in the TPC command field of the DCI is the TPC command of closed loop index 0 and the second 2 bits in the TPC command field of the DCI is the TPC command of closed loop index 1. Therefore, each power control parameter set of the two power control parameter sets associated with the SRI value in the SRI field is associated with a TPC command of 2 TPC commands in the TPC command field.

For example, the first 2 bits of TPC command is associated with the power control parameter set 0 since the power control parameter set 0 includes closed loop index 0, and the second 2 bits of the TPC command is associated with the power control parameter set 1 since the power control parameter set 1 includes closed loop index 1.

It should be understood that 4 bits being in the TPC command field is just an example, and persons skilled in the art would appreciate that other number of bits can also be used according to actual situations or needs.

In some other embodiments, there are 2 bits in the TPC command field of the DCI. The 2 bits in the TPC command field of the DCI is the TPC command of a closed loop index. That is, there is only one closed loop index, both the first power control parameter set and the second power control parameter set include the same closed loop index. In other words, for example, the closed loop index 0 and the closed loop index 1 as shown in FIG. 3 are the same closed loop index.

Besides, a mapping pattern is configured to indicate each PUSCH repetition which SRS resource for codebook based transmission or SRS resource subset for non-codebook based transmission is associated with. In this exemplary scenario, as show in FIG. 3, it is assumed that the mapping pattern is 1122, which means the first SRS resource (e.g., SRS resource 0) for codebook based transmission or the first SRS resource subset (e.g., SRS resource subset 0) for non-codebook based transmission indicated by SRI 0 is associated with the transmission of the first and second PUSCH repetitions (e.g., PUSCH repetition 1 and PUSCH repetition 2), and the second SRS resource (e.g., SRS resource 1) for codebook based transmission or the second SRS resource subset (e.g., SRS resource subset 1) for non-codebook based transmission indicated by SRI 1 is associated the transmission of the third and fourth PUCCH repetitions (e.g., PUSCH repetition 3 and PUSCH repetition 4).

Since SRI 0 is associated with power control parameter set 0 and the first 2 bits of the TPC command in the TPC command field, the power of first and second PUSCH repetitions (e.g., PUSCH repetition 1 and PUSCH repetition 2) is determined according to the power control parameter set 0 and its associated TPC command. Since SRI 1 is associated with power control parameter set 1 and the second 2 bits of the TPC command in the TPC command field, the power of third and fourth repetitions (e.g., PUSCH repetition 3 and PUSCH repetition 4) is determined by the power control parameter set 1 and its associated TPC command.

Figure 4:
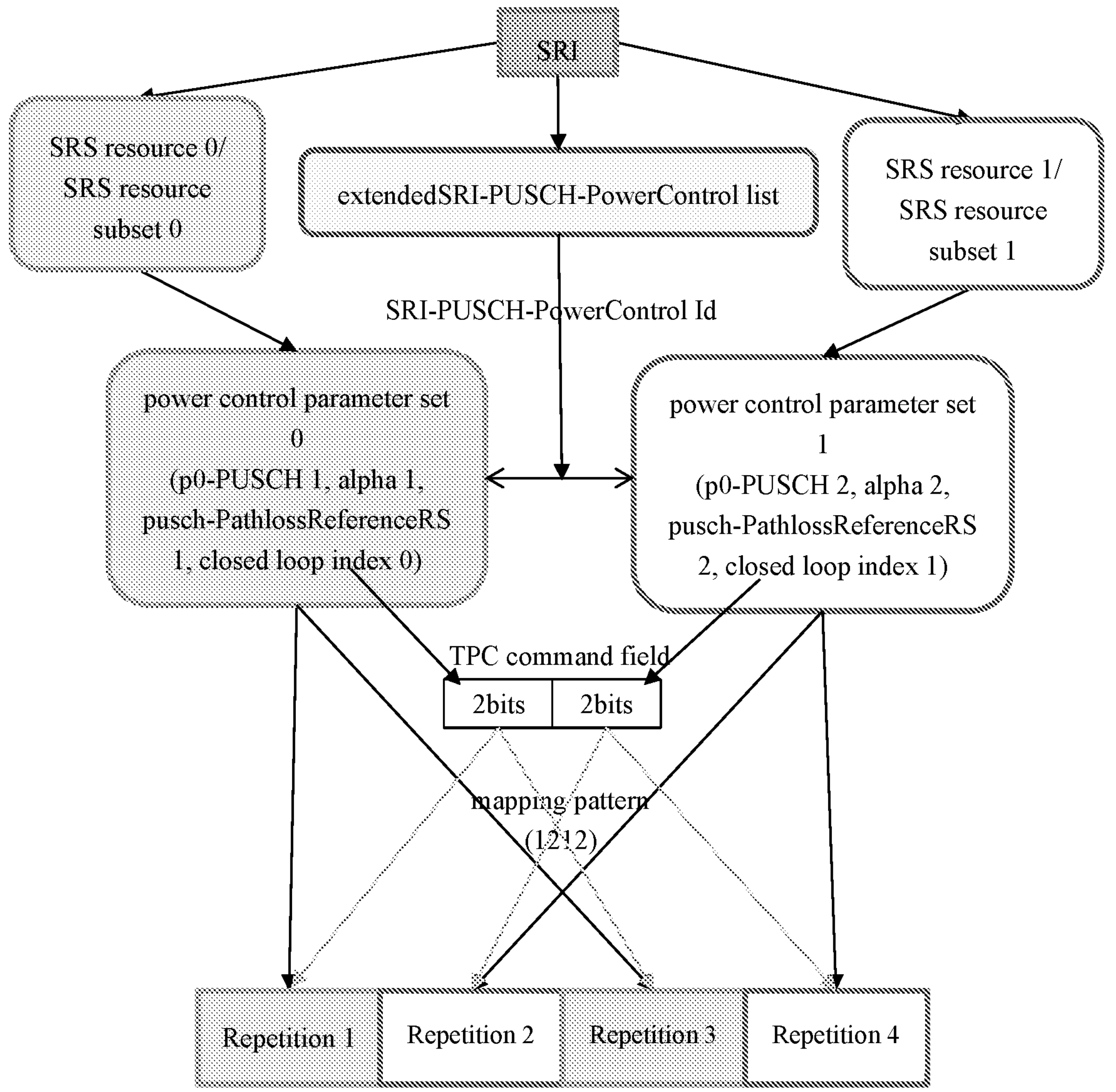
FIG. 4 illustrates another exemplary scenario of power control of PUSCH repetition according to another embodiment of the present disclosure.

FIG. 4 illustrates another exemplary scenario of power control of PUSCH repetition according to an embodiment of the present disclosure.

In this exemplary scenario, it is assumed that a PUSCH transmission is configured to be transmitted repeatedly in 4 slots.

As shown in FIG. 4, a UE may receive a DCI for scheduling a PUSCH transmission from a BS, and the DCI includes an SRI field. In the SRI filed, there is one SRI value, e.g., SRI as shown in FIG. 4. The SRI value indicates 2 SRS resources (e.g., SRS resource 0 and SRS resource 1) of 2 SRS resource sets for codebook based PUSCH transmission or 2 SRS resource subsets (e.g., SRS resource subset 0 and SRS resource subset 1) of 2 SRS resource sets for non-codebook based PUSCH transmission.

In an embodiment, the mapping of the SRI value in the SRI field to the SRS resources for codebook based transmission or SRS resource subsets for non-codebook based transmission may be updated by a medium access control-control element (MAC-CE). This embodiment is similar to PDSCH repetition in R16, which means two spatial relation information associated with 2 SRS resources for codebook transmission or 2 SRS resource subsets for non-codebook transmission are jointly indicated by one SRI value in the SRI field of the DCI.

Accordingly, an SRI-PUSCH-PowerControl Id in the SRI-PUSCH-PowerControl list should be mapped to 2 power control parameter sets, which means there are two p0-PUSCH values, two alpha values, two PUSCH pathloss reference RSs and two closed loop indexes configured for an SRI-PUSCH-PowerControl Id. It should be understood that 2 power control parameter sets are just an example, and the number of the power control parameter sets can be changed according to actual needs.

RRC configuration signaling of SRI-PUSCH-PowerControl in TS 38.331 should be updated as follows where only one SRI-PUSCH-PowerControl list is configured. In this example, only one SRI-PUSCH-PowerControl Id is illustrated, it should be understood that additional SRI-PUSCH-PowerControl Ids may be within the SRI-PUSCH-PowerControl list according to actual needs.

```
SRI-PUSCH-PowerControl ::=                SEQUENCE {
    sri-PUSCH-PowerControlId                  SRI-PUSCH-PowerControlId,
    sri-PUSCH-PathlossReferenceRS-Id          PUSCH-PathlossReferenceRS-Id,
    sri-PUSCH-PathlossReferenceRS-Id1         PUSCH-PathlossReferenceRS-Id,
    sri-P0-PUSCH-AlphaSetId                   P0-PUSCH-AlphaSetId,
    sri-P0-PUSCH-AlphaSetId1                  P0-PUSCH-AlphaSetId,
    sri-PUSCH-ClosedLoopIndex                 ENUMERATED { i0, i1 }
    sri-PUSCH-ClosedLoopIndex1                ENUMERATED { i0, i1 }
}
```

Therefore, the SRI value in the SRI field of the DCI is associated with 2 power control parameter sets mapped to an SRI-PUSCH-PowerControl Id of the SRI-PUSCH-PowerControl list indicated by the SRI value in the SRI field. In this exemplary scenario, the SRI-PUSCH-PowerControl list indicated by the SRI value in the SRI field is the extended SRI-PUSCH-PowerControl list as show in FIG. 4.

Furthermore, the first SRS resource for codebook based transmission or the first SRS resource subset for non-codebook based transmission indicated by the SRI value is associated with the first power control parameter set, and the second SRS resource for codebook based transmission or the second SRS resource subset for non-codebook transmission indicated by the SRI is associated with the second power control parameter set. For example, as shown in FIG. 4, SRS resource 0/SRS resource subset 0 is associated to power control parameter set 0 composed of p0-PUSCH 1, alpha 1, pusch-PathlossReferenceRS 1 and closed loop index 0. And SRS resource 1/SRS resource subset 1 is associated with power control parameter set 1 composed of p0-PUSCH 2, alpha 2, pusch-PathlossReferenceRS 2 and closed loop index 1.

In this exemplary scenario, as shown in FIG. 4, there are 4 bits in the TPC command field of the DCI. The first 2 bits in the TPC command field of the DCI is the TPC command of closed loop index 0 and the second 2 bits in the TPC command field of the DCI is the TPC command of closed loop index 1. Therefore, each power control parameter set of the two power control parameter sets associated with the SRI value in the SRI field is associated with a TPC command of 2 TPC commands in the TPC command field.

For example, the first 2 bits of TPC command is associated with the power control parameter set 0 since the power control parameter set 0 includes closed loop index 0, and the second 2 bits of the TPC command is associated with the power control parameter set 1 since the power control parameter set 1 includes closed loop index 1.

It should be understood that 4 bits being in the TPC command field is just an example, and persons skilled in the art would appreciate that other number of bits can also be used according to actual situations or needs.

In some other embodiments, there are 2 bits in the TPC command field of the DCI. The 2 bits in the TPC command field of the DCI is the TPC command of a closed loop index. That is, there is only one closed loop index, both the first power control parameter set and the second power control parameter set include the same closed loop index. In other words, for example, the closed loop index 0 and the closed loop index 1 as shown in FIG. 4 are the same closed loop index.

Besides, a mapping pattern is configured to indicate each PUSCH repetition which SRS resource for codebook based transmission or SRS resource subset for non-codebook based transmission is associated with. In this exemplary scenario, as show in FIG. 4, it is assumed that the mapping pattern is 1212, which means the first SRS resource (e.g., SRS resource 0) for codebook based transmission or the first SRS resource subset (e.g., SRS resource subset 0) for non-codebook based transmission is associated with the transmission of the first and third PUSCH repetitions (e.g., PUSCH repetition 1 and PUSCH repetition 3), and the second SRS resource (e.g., SRS resource 1) for codebook based transmission or the second SRS resource subset (e.g., SRS resource subset 1) for non-codebook based transmission is associated with the transmission of the second and fourth PUSCH repetitions (e.g., PUSCH repetition 2 and PUSCH repetition 4).

Since the first SRS resource (e.g., SRS resource 0) for codebook based transmission or the first SRS resource subset (e.g., SRS resource subset 0) for non-codebook based transmission is associated with power control parameter set 0 and the first 2 bits of the TPC command of the DCI, the power of first and third repetitions (e.g., PUSCH repetition 1 and PUSCH repetition 3) is determined according to the power control parameter set 0 and its associated TPC command as shown in FIG. 4. Since the second SRS resource (e.g., SRS resource 1) for codebook based transmission or the second SRS resource subset (e.g., SRS resource subset 1) for non-codebook based transmission is associated with power control parameter set 1 and the second 2 bits of the TPC command of the DCI, the power of second and fourth repetitions (e.g., PUSCH repetition 2 and PUSCH repetition 4) is determined according to the power control parameter set 1 and its associated TPC command as shown in FIG. 4.

Therefore, through the above described embodiments of the present application, a plurality power control parameter sets can be indicated, and the power of each PUSCH repetition can be determined by one of power control parameter sets and its associated TPC command according to the configured beam mapping pattern.

Figure 5:
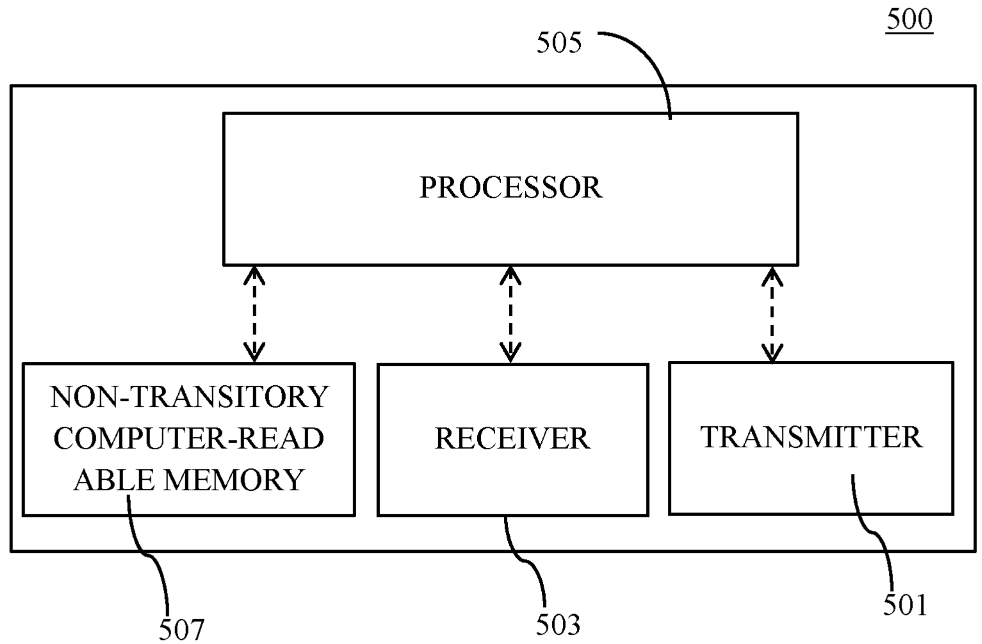
FIG. 5 is a schematic block diagram illustrating an exemplary apparatus according to an embodiment of the present disclosure.

FIG. 5 illustrates an apparatus according to some embodiments of the present application. In some embodiments of the present disclosure, the apparatus 500 may be UE 105 illustrated in FIG. 1 or the UE in other embodiments of the present application.

As shown in FIG. 5, the apparatus 500 may include a receiver 501, a transmitter 503, a processer 505, and a non-transitory computer-readable medium 507. The non-transitory computer-readable medium 507 has computer executable instructions stored therein. The processer 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the above methods according to embodiments of the present application.

Figure 6:
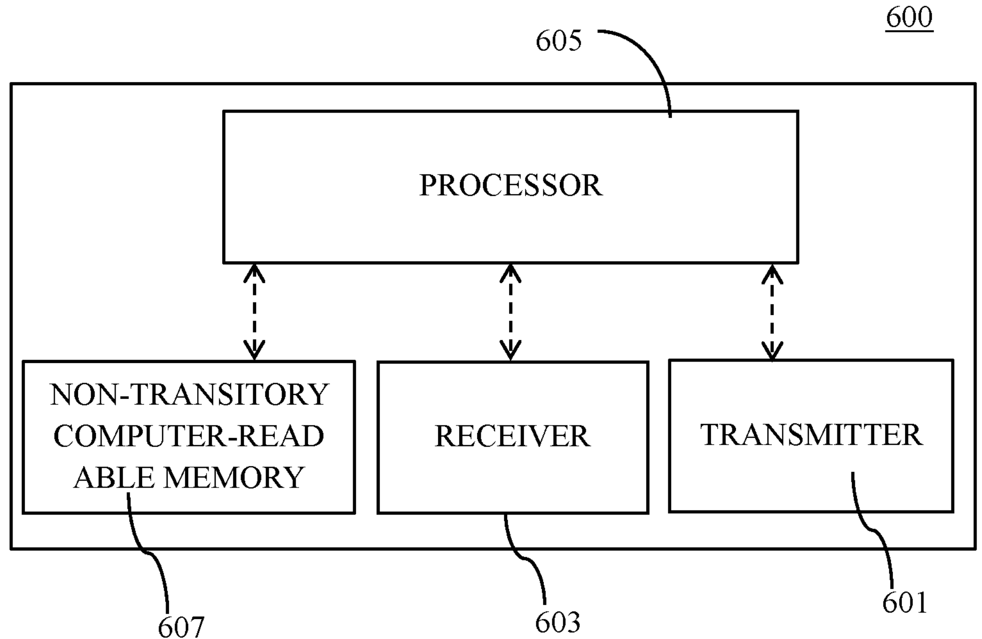
FIG. 6 is a schematic block diagram illustrating another exemplary apparatus according to an embodiment of the present disclosure.

FIG. 6 illustrates an apparatus according to some other embodiments of the present application. In some embodiments of the present disclosure, the apparatus 600 may be BS 101 illustrated in FIG. 1 or the BS in other embodiments of the present application.

As shown in FIG. 6, the apparatus 600 may include a receiver 601, a transmitter 603, a processer 605, and a non-transitory computer-readable medium 607. The non-transitory computer-readable medium 607 has computer executable instructions stored therein. The processer 605 is configured to be coupled to the non-transitory computer readable medium 607, the receiver 601, and the transmitter 603. It is contemplated that the apparatus 600 may include more computer-readable mediums, receiver, transmitter and processors in some other embodiments of the present application according to practical requirements. In some embodiments of the present application, the receiver 601 and the transmitter 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:

receiving a mapping pattern and a configuration of a plurality of power control parameter sets for a physical uplink shared channel (PUSCH) transmission, the PUSCH transmission configured to be transmitted in a plurality of time intervals repeatedly, wherein the configuration of the plurality of power control parameter sets includes at least a first SRI-PUSCH-PowerControl list and a second SRI-PUSCH-PowerControl list, each SRI-PUSCH-PowerControl list including at least one power control parameter set;

receiving a downlink control information (DCI) for scheduling the PUSCH transmission, the DCI including a sounding reference signal resource indicator (SRI) field that includes two SRI values that each indicate one of a sounding reference signal (SRS) resource for codebook based transmission or an SRS resource subset for non-codebook based transmission and further including a transmission power control (TPC) command field that indicates a first TPC command that corresponds to a first closed loop index and a second TPC command that corresponds to a second closed loop index, wherein a first power control parameter set is indicated by a first SRI value mapped to the first SRI-PUSCH-PowerControl list and a second power control parameter set is indicated by a second SRI value mapped to the second SRI-PUSCH-PowerControl list, and wherein the mapping pattern indicates each PUSCH repetition associated with the SRS resource for codebook based transmission, or the SRS resource subset for non-codebook based transmission, and wherein a number of SRI-PUSCH-PowerControl lists is a same number as a number of SRI values;

determining a power of each PUSCH repetition of the PUSCH transmission based on at least one SRI value in the SRI field, the configuration of the plurality of power control parameter sets, and the mapping pattern; and transmitting the PUSCH transmission in the plurality of time intervals repeatedly based on the determined power of each PUSCH repetition of the PUSCH transmission and the mapping pattern.

2. The method of claim 1, wherein each of the plurality of the power control parameter sets includes at least one of a power offset, a compensation factor, a pathloss reference RS, or a closed loop index.

3. The method of claim 1, wherein the first power control parameter set and the second power control parameter set are associated with the first TPC command and the second TPC command respectively, and the first closed loop index and the second closed loop index are included in the first power control parameter set and the second power control parameter set, respectively.

4. The method of claim 3, further comprising:

determining the power of each PUSCH repetition of the PUSCH transmission based on a power control parameter set associated with an SRI value which is associated with each PUSCH repetition and a corresponding TPC command of the first TPC command and the second TPC command.

5. The method of claim 1, wherein the configuration of the plurality of power control parameter sets includes a SRI-PUSCH-PowerControl list, wherein at least two of the plurality of power control parameter sets are configured for at least one SRI-PUSCH-PowerControl Id within the SRI-PUSCH-PowerControl list, and wherein a number of the indicated SRS resources for codebook based transmission or the indicated SRS resource subsets for non-codebook transmission is a same number as a number of configured power control parameter sets in the SRI-PUSCH-PowerControl Id where an SRI value is mapped.

6. The method of claim 5, wherein the SRI value indicates two SRS resources for codebook based transmission or two SRS resource subsets for non-codebook based transmission, and in the SRI-PUSCH-PowerControl list, two power control parameter sets including the first power control parameter set and the second power control parameter set are configured for the SRI-PUSCH-PowerControl Id where the SRI value is mapped.

7. The method of claim 6, wherein a first SRS resource of the two SRS resources for codebook based transmission or a first SRS resource subset of the two SRS resource subsets for non-codebook based transmission is associated with the first power control parameter set, and a second SRS resource of the two SRS resources for codebook based transmission or a second SRS resource subset of the two SRS resource subsets for non-codebook based transmission is associated with the second power control parameter set.

8. The method of claim 7, wherein the first power control parameter set and the second power control parameter set are associated with the first TPC command and the second TPC command respectively, and the first closed loop index and the second closed loop index are included in the first power control parameter set and the second power control parameter set respectively.

9. A user equipment (UE) for wireless communication, comprising:

at least one memory; and at least one processor coupled with the at least one memory and configured to cause the UE to:

receive a mapping pattern and a configuration of a plurality of power control parameter sets for a physical uplink shared channel (PUSCH) transmission, the PUSCH transmission configured to be transmitted in a plurality of time intervals repeatedly, wherein the configuration of the plurality of power control parameter sets includes at least a first SRI-PUSCH-PowerControl list and a second SRI-PUSCH-PowerControl list, each SRI-PUSCH-PowerControl list including at least one power control parameter set;

receive a downlink control information (DCI) for scheduling the PUSCH transmission, the DCI including a sounding reference signal resource indicator (SRI) field that includes two SRI values that each indicate one of a sounding reference signal (SRS) resource for codebook based transmission or an SRS resource subset for non-codebook based transmission and further including a transmission power control (TPC) command field that indicates a first TPC command that corresponds to a first closed loop index and a second TPC command that corresponds to a second closed loop index, wherein a first power control parameter set is indicated by a first SRI value mapped to the first SRI-PUSCH-PowerControl list and a second power control parameter set is indicated by a second SRI value mapped to the second SRI-PUSCH-PowerControl list, and wherein the mapping pattern indicates each PUSCH repetition associated with the SRS resource for codebook based transmission, or the SRS resource subset for non-codebook based transmission, and wherein a number of SRI-PUSCH-PowerControl lists is a same number as a number of SRI values;

determine a power of each PUSCH repetition of the PUSCH transmission based on at least one SRI value in the SRI field, the configuration of the plurality of power control parameter sets, and the mapping pattern; and transmit the PUSCH transmission in the plurality of time intervals repeatedly based on the determined power of each PUSCH repetition of the PUSCH transmission and the mapping pattern.

10. The UE of claim 9, wherein the first power control parameter set and the second power control parameter set are associated with the first TPC command and the second TPC command respectively, and the first closed loop index and the second closed loop index are included in the first power control parameter set and the second power control parameter set, respectively.

11. The UE of claim 10, wherein the power of each PUSCH repetition of the PUSCH transmission is determined by: determining the power of each PUSCH repetition of the PUSCH transmission based on a power control parameter set associated with an SRI value which is associated with each PUSCH repetition and a corresponding TPC command of the first TPC command and the second TPC command.

12. The UE of claim 9, wherein the configuration of the plurality of power control parameter sets includes a SRI-PUSCH-PowerControl list, wherein at least two of the plurality of power control parameter sets are configured for at least one SRI-PUSCH-PowerControl Id within the SRI-PUSCH-PowerControl list, and wherein a number of the indicated SRS resources for codebook based transmission or the indicated SRS resource subsets for non-codebook transmission is a same number as a number of configured power control parameter sets in the SRI-PUSCH-PowerControl Id where an SRI value is mapped.

13. The UE of claim 12, wherein the SRI value indicates two SRS resources for codebook based transmission or two SRS resource subsets for non-codebook based transmission, and in the SRI-PUSCH-PowerControl list, two power control parameter sets including the first power control parameter set and the second power control parameter set are configured for the SRI-PUSCH-PowerControl Id where the SRI value is mapped.

14. The UE of claim 13, wherein a first SRS resource of the two SRS resources for codebook based transmission or a first SRS resource subset of the two SRS resource subsets for non-codebook based transmission is associated with the first power control parameter set, and a second SRS resource of the two SRS resources for codebook based transmission or a second SRS resource subset of the two SRS resource subsets for non-codebook based transmission is associated with the second power control parameter set.

15. The UE of claim 14, wherein the first power control parameter set and the second power control parameter set are associated with the first TPC command and the second TPC command respectively, and the first closed loop index and the second closed loop index are included in the first power control parameter set and the second power control parameter set respectively.

16. The UE of claim 9, wherein each of the plurality of the power control parameter sets includes at least one of a power offset, a compensation factor, a pathloss reference RS, or a closed loop index.

17. A base station for wireless communication, comprising:

at least one memory; and at least one processor coupled with the at least one memory and configured to cause the base station to:

transmit a mapping pattern and a configuration of a plurality of power control parameter sets for a physical uplink shared channel (PUSCH) transmission, the PUSCH transmission configured to be transmitted in a plurality of time intervals repeatedly, wherein the configuration of the plurality of power control parameter sets includes at least a first SRI-PUSCH-PowerControl list and a second SRI-PUSCH-PowerControl list, each SRI-PUSCH-PowerControl list including at least one power control parameter set;

transmit a downlink control information (DCI) for scheduling the PUSCH transmission, the DCI including a sounding reference signal resource indicator (SRI) field that includes two SRI values that each indicate one of a sounding reference signal (SRS) resource for codebook based transmission or an SRS resource subset for non-codebook based transmission and further including a transmission power control (TPC) command field that indicates a first TPC command that corresponds to a first closed loop index and a second TPC command that corresponds to a second closed loop index, wherein a first power control parameter set is indicated by a first SRI value mapped to the first SRI-PUSCH-PowerControl list and a second power control parameter set is indicated by a second SRI value mapped to the second SRI-PUSCH-PowerControl list, and wherein the mapping pattern indicates each PUSCH repetition associated with the SRS resource for codebook based transmission, or the SRS resource subset for non-codebook based transmission, and wherein a number of SRI-PUSCH-PowerControl lists is a same number as a number of SRI values; and receive the PUSCH transmission in the plurality of time intervals repeatedly, wherein a power of each PUSCH repetition of the PUSCH transmission is determined based on at least one SRI value in the SRI field, the configuration of the plurality of power control parameter sets, and the mapping pattern.

18. The base station of claim 17, wherein each of the plurality of the power control parameter sets includes at least one of a power offset, a compensation factor, a pathloss reference RS, or a closed loop index.

19. A method performed by a base station, the method comprising:

transmitting a mapping pattern and a configuration of a plurality of power control parameter sets for a physical uplink shared channel (PUSCH) transmission, the PUSCH transmission configured to be transmitted in a plurality of time intervals repeatedly, wherein the configuration of the plurality of power control parameter sets includes at least a first SRI-PUSCH-PowerControl list and a second SRI-PUSCH-PowerControl list, each SRI-PUSCH-PowerControl list including at least one power control parameter set;

transmitting a downlink control information (DCI) for scheduling the PUSCH transmission, the DCI including a sounding reference signal resource indicator (SRI) field that includes two SRI values that each indicate one of a sounding reference signal (SRS) resource for codebook based transmission or an SRS resource subset for non-codebook based transmission and further including a transmission power control (TPC) command field that indicates a first TPC command that corresponds to a first closed loop index and a second TPC command that corresponds to a second closed loop index, wherein a first power control parameter set is indicated by a first SRI value mapped to the first SRI-PUSCH-PowerControl list and a second power control parameter set is indicated by a second SRI value mapped to the second SRI-PUSCH-PowerControl list, and wherein the mapping pattern indicates each PUSCH repetition associated with the SRS resource for codebook based transmission, or the SRS resource subset for non-codebook based transmission, and wherein a number of the SRI-PUSCH-PowerControl lists is a same number as a number of the SRI values; and receiving the PUSCH transmission in the plurality of time intervals repeatedly, wherein a power of each PUSCH repetition of the PUSCH transmission is determined based on at least one SRI value in the SRI field, the configuration of the plurality of power control parameter sets, and the mapping pattern.

20. The method of claim 19, wherein each of the plurality of the power control parameter sets includes at least one of a power offset, a compensation factor, a pathloss reference RS, or a closed loop index.

* * * * *